United States Patent
Keenly et al.

(10) Patent No.: US 7,525,215 B2
(45) Date of Patent: Apr. 28, 2009

(54) POWER-AWARE MULTI-CIRCUIT SYSTEM AND METHOD

(75) Inventors: Michael R. Keenly, Menlo Park, CA (US); Zubin Sarkary, San Jose, CA (US); Marko Radojicic, Los Altos, CA (US); Sudheer Poorna Chandra Matta, Tracy, CA (US); Philip Riley, Antioch, CA (US)

(73) Assignee: Trapeze Networks, Inc., Pleasanton, CA (US)

( * ) Notice: Subject to any disclaimer, the term of this patent is extended or adjusted under 35 U.S.C. 154(b) by 262 days.

(21) Appl. No.: 11/690,654

(22) Filed: Mar. 23, 2007

(65) Prior Publication Data

US 2008/0231116 A1    Sep. 25, 2008

(51) Int. Cl.
*H04B 3/54* (2006.01)
(52) U.S. Cl. ............................................. 307/6
(58) Field of Classification Search .................. 307/6
See application file for complete search history.

(56) References Cited

U.S. PATENT DOCUMENTS

| | | | |
|---|---|---|---|
| 6,218,930 B1 | 4/2001 | Katzenberg et al. | |
| 7,124,321 B2 | 10/2006 | Garnett et al. | |
| 2005/0086546 A1* | 4/2005 | Darshan et al. | ............. 713/300 |
| 2006/0251179 A1 | 11/2006 | Ghoshal | |

FOREIGN PATENT DOCUMENTS

WO    WO-2007/027673    3/2007

OTHER PUBLICATIONS

Press Release Network-1 " Network-1 Announces Power Up Licensing Program, Provides Licensing Incentives for Early Adopters of Essential Power Over Ethernet (PoE) Technology" (2005).
International Search Report, PCT/US2008/058010, (Jul. 11, 2008).

* cited by examiner

*Primary Examiner*—Robert L. Deberadinis
(74) *Attorney, Agent, or Firm*—Perkins Coie LLP

(57) ABSTRACT

A technique for operating a device at multiple different power levels dependent upon the amount of power received involves sensing the amount of power received and turning on circuit components or system functionality if power is adequate. A device constructed according to the technique should have the ability to detect at least two different, non-zero, power levels and turn on circuits or system functionality to the extent that sufficient power is detected.

20 Claims, 5 Drawing Sheets

POWER-AWARE MULTI-CIRCUIT SYSTEM AND METHOD

BACKGROUND

Circuits draw electrical power at a rate that is determined by the functionality and efficiency of the circuits. For example, a wireless access point (AP) might receive 12.95 W using traditional Power over Ethernet (PoE) technology based on IEEE 802.3af, which is a technology that describes a technique for transmitting data and power to remote devices in an Ethernet network.

Circuits may be configured to use more or less power under certain circumstances. For example, a computer may enter powersave mode during which a subset of available circuitry is used in order to conserve power. However, in these cases the, e.g., computer is not aware of the power that is available. In systems that may be exposed to more than one level of power, this may not be optimal.

These are but a subset of the problems and issues associated with supplying power to a circuit, and are intended to characterize weaknesses in the prior art by way of example. The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for operating a device at multiple power levels dependent upon the amount of power provided involves sensing the amount of power provided and turning on circuit components if power is adequate. A method according to the technique may include providing high power functionality if high power is provided on either a first port or a second port, and providing high power functionality if low power is provided on the first port and the second port. A system constructed according to the technique may include a first port having a first pairs set, which may include two powered device (PD) circuits, and a second pairs set, which may include two PD circuits; a first PD circuit, coupled to the first pairs set; a second PD circuit, coupled to the second pairs set; and a power sum circuit coupled to the first PD circuit and the second PD circuit wherein, in operation, the power provided on the first pairs set is added to the power provided on the second pairs set and output by the power sum circuit to the load.

The proposed system can offer, among other advantages, optimized functionality for multiple technologies that have different power levels. For example, in a wireless access point (AP) embodiment, the system can provide 802.11n (high power) functionality when available, and 802.11a/b/g (low or 'standard' power) functionality when high power is not available. This and other advantages of the techniques described herein will become apparent to those skilled in the art upon a reading of the following descriptions and a study of the several figures of the drawings.

BRIEF DESCRIPTION OF THE DRAWINGS

Embodiments of the invention are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

When turned on, the system defaults to a low power state (including primary/aux functionality). Based upon the Power Good (PG) signals, we will determine whether to use a high power. The digital logic block receives PG signals and makes decision.

Figure 1:
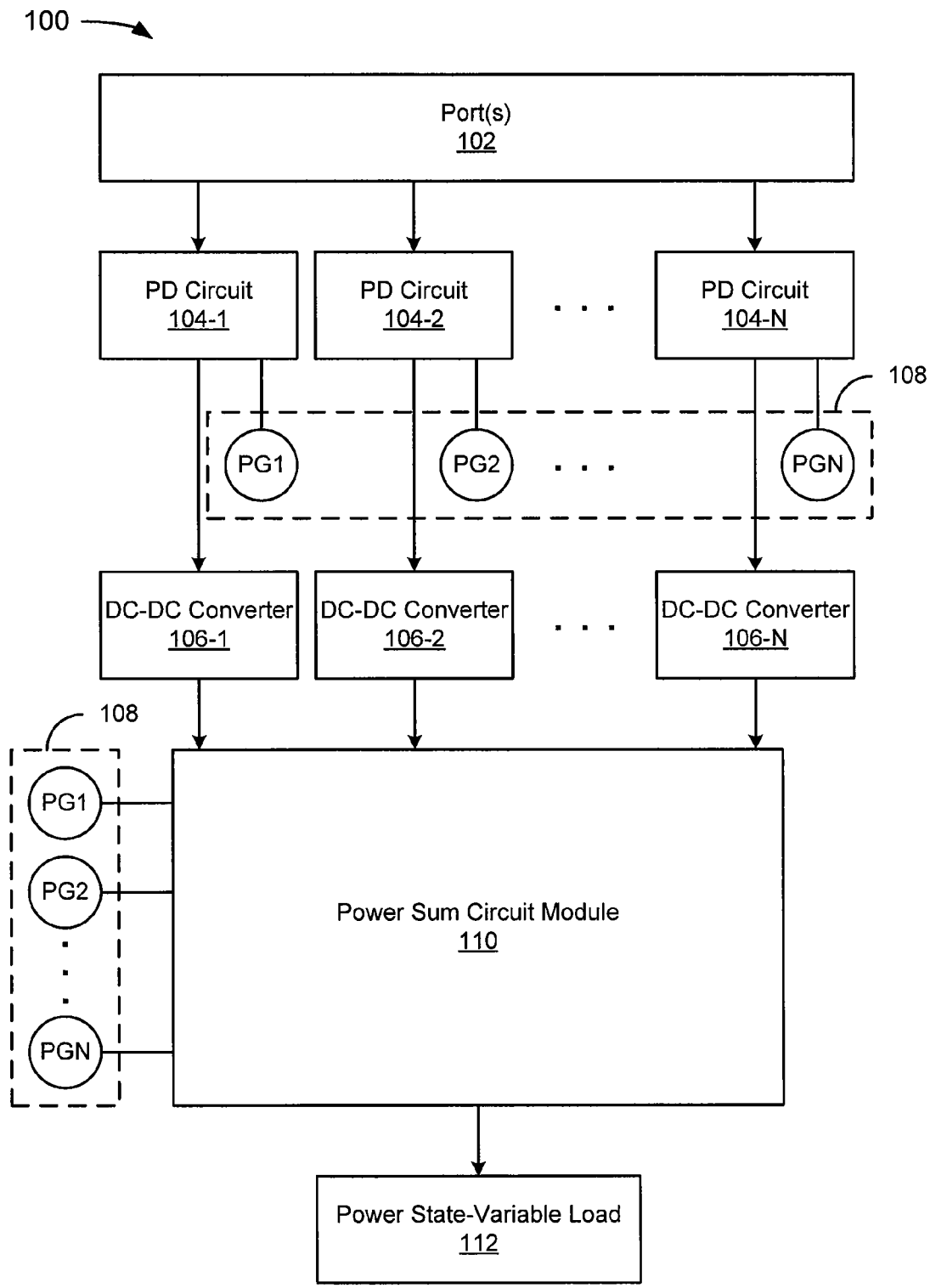
FIG. 1 depicts an example of a system for powering a state-variable load.

FIG. 1 depicts an example of a system 100 for powering a state-variable load. The system 100 includes port(s) 102 (referred to as the port 102), powered device (PD) circuits 104-1 to 104-N (referred to collectively as PD circuits 104), direct current to direct current (DC-DC) converters 106-1 to 106-N (referred to collectively as DC-DC converters 106), power good (PG) signal paths 108, a power sum circuit module 110, and a state-variable load 112. In the example of FIG. 1, the output of the DC-DC converters 106 and the PG signal paths 108 are coupled to the power sum circuit module 110. The power sum circuit module 110 is coupled to the state-variable load 112.

The port 102 may be any of a variety of different ports, and a comprehensive listing of all ports does not seem necessary since those of skill in the art would understand how to use the teachings provided herein for any applicable known or convenient port. In an illustrative embodiment, the port 102 has a plurality of pairs of pins (plus, sometimes, one extra pin: ground) on which power and/or other signals can be provided. In some cases, the pairs may provide only signal—such as with an RS232 port or a PC parallel port—and power can be "siphoned off" of the signal. Thus, even for ports that have no designated power pairs, techniques described herein may be valuable. Some ports—such as an RJ45 port—provide power over certain pairs and data over others. Incidentally, the RJ45 ports also have an even number of pins—eight—each of which is part of an identifiable pair. For illustrative simplicity, the port 102 is sometimes assumed in this paper to be an RJ45 port, which is a Power over Ethernet (PoE)-compliant port.

Since the ports may be designed to be compliant with existing technology, advantageously the device can be plugged into existing equipment.

The port 102 is coupled to the PD circuits 104. The port 102 may or may not include one port per two of the PD circuits 104. For example, the port 102 may or may not include N/2 RJ45 ports respectively coupled to the PD circuits 104-1 to 104-N, where N is an even number. As another example, the port 102 may include a constant or variable number of PD circuits per port (from one PD circuit per port to practically any number of PD circuits per port, and either the same number across each port or a variable number of PD circuits depending upon the port or implementation-specific decisions).

A purpose of the PD circuits 104 is to act as a switch for potentially coupling "+Voltage" of the port 102 to "−Voltage" of the port 102 and forming a circuit thereby. If the switch is open, then no circuit is formed. If the switch is closed, then a circuit may (dependent upon the state of the circuit) be formed. Any applicable known or convenient PD circuit may be used, and the PD circuits 104 may include PD chips.

The PD circuits 104 are respectively coupled to the DC-DC converters 106. In an alternative, the number of PD circuits 104 and DC-DC converters 106 could be different. Any applicable known or convenient DC-DC converter could be used.

The output from the PD circuits 104 to the DC-DC converters may be referred to as power outputs. In the example of FIG. 1, the PD circuits 104 also have a PG output represented in FIG. 1 as the PG signal paths 108. A given PG signal is true if the respective one of the PD circuits 104 has power passing through it. The amount of power over a threshold that generates a PG true signal may or may not be detectable. For example, the PD circuits 104 may be associated with a 12.95 W. If 12.95 W of power passes through one of the PD circuits 104, then the corresponding PG signal is true. However, if 15 W of power passes through one of the PD circuits 104, then, although the corresponding PG signal may be true, the circuit may not be aware of the additional power that is available. Accordingly, it may be desirable in certain implementations to include a power-sense circuit to generate additional signals that correspond to additional power.

The power outputs and PG outputs are both coupled to the power sum circuit module 110. As the name implies, the power sum circuit module 110 can sum power from a first one of the PD circuits 104 with power from a second one of the PD circuits 104. The algorithm that is implemented in hardware (or embodied in a computer-readable medium, if applicable) is implementation-specific.

The power sum circuit module 110 may include a logic block (not shown) that provides signals to the power state-variable load 112 regarding what portions of the power state-variable load 112 should draw power from the power sum circuit module 110. For example, if the PG signals 108 include one true value, the power state-variable load 112 can be powered at a first (low) level. Continuing this example, if the PG signals 108 include two true values, the power state-variable load 112 can be powered at a second level, and so forth.

The power sum circuit module 110 is coupled to a power state-variable load 1112. The power state-variable load 112 is different depending upon the power provided by the power sum circuit module 110. Thus, if the power sum circuit module 110 provides "high" power, the power state-variable load 112 may include full functionality, while if the power sum circuit 110 provides "low" power, the power state-variable load 112 may include limited or reduced functionality.

In an illustrative embodiment, since the power state-variable load 112 is sensitive to the available power, a load, such as a CPU, can operate at different speeds based on the available power. Many computers change CPU speed in response to the amount of work to be done. This is especially true for laptops, which run in slower low-power modes most of the time, unless there is a lot of work to be done. There are many different schemes for changing the speed of the CPU in response to external factors. Commonly, the deciding factor is the amount of work to do, so that the CPU will ramp up in response to load. Using techniques described herein, a "governor" could be written to note the amount of power available and to place a cap on the CPU speed due to the lack of available power.

As an example, say a computer can run its CPU at 1.0 GHz, 1.8 GHz, and 2.0 GHz. When "full power" is available, the computer would be able to choose any speed up to 2.0 GHz for maximum performance. However, when "reduced power" is available, the computer can cap the speed at 1.8 GHz. (In this case, the system would be free to choose between the 1.0 and 1.8 GHz speeds, depending on performance needs.)

In a wireless context, the load may shut off one or more radios when operating in a low power mode, and power all radios when at full power. As another example, in a wireless context, in addition to applying to whole radios being on or off, an AP might choose to power up low power radios instead of high power radios. By way of example but not limitation, the low power radio could be 802.11b, where 802.11a and 802.11g are medium power radios, and 802.11n is a high power radio.

Another wireless example involves restricting the availability of certain software features when in a low power mode. For example, if the analysis for forming aggregates (described by way of example but not limitation in U.S. patent application Ser. No. 11/648,359 entitled System and Method for Aggregation and Queuing in a Wireless Network, filed by Gast et al. on Dec. 28, 2006, which is incorporated by reference) required intensive CPU analysis, the queuing software would be disabled in a low power mode. As another example, a rogue detection system requires extensive CPU work. It could be disabled or reduced in frequency if the AP operated under low-power conditions.

There are many other examples of how the techniques provided herein could be applied to devices having different modes of operation. Depending upon the implementation and/or embodiment, some devices may be capable of receiving direct power that enables full power operation so long as the power supply is unbroken. Such a system is depicted in FIG. 2.

Figure 2:
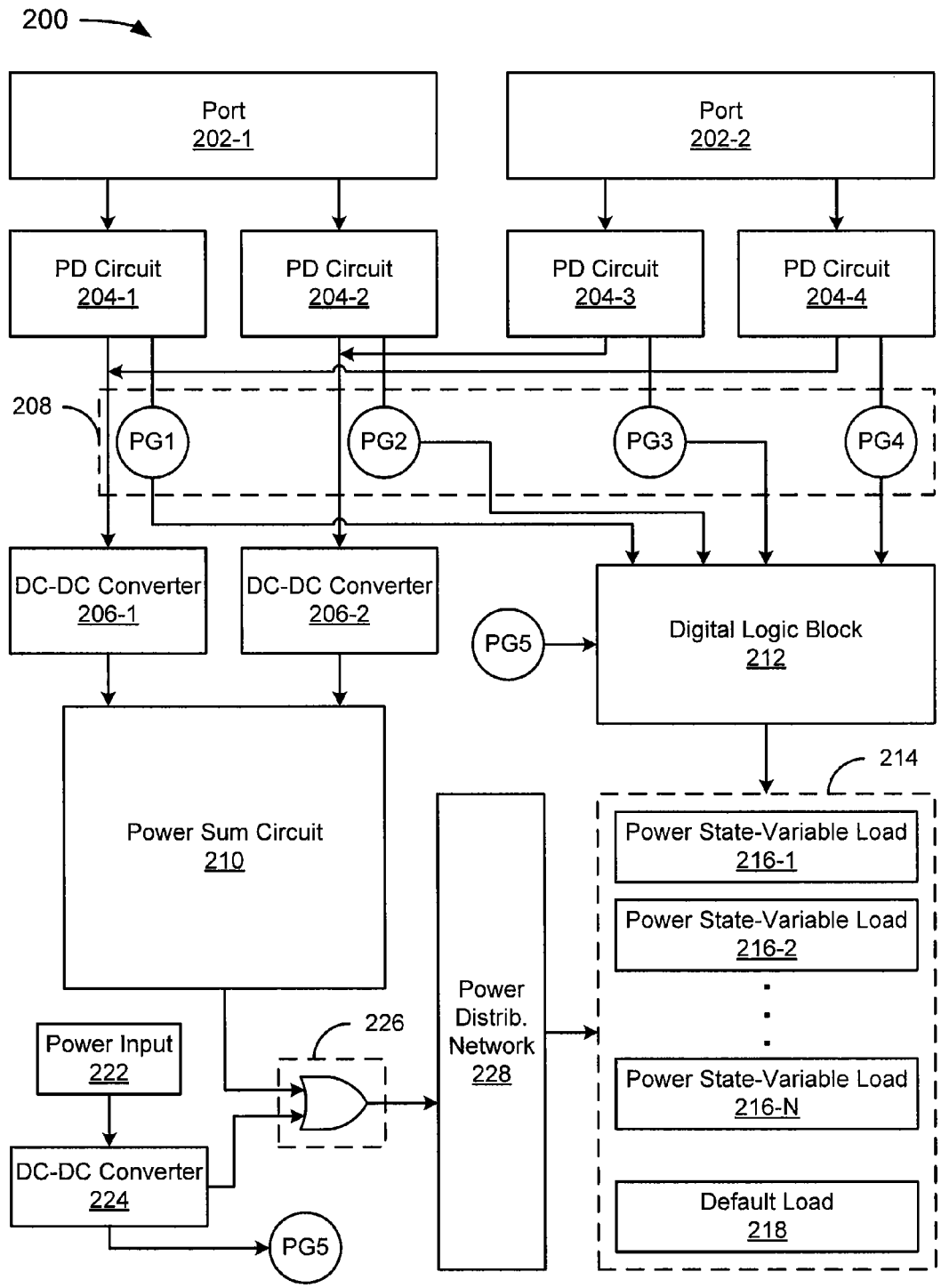
FIG. 2 depicts an example of a system for powering a state-variable load using one or two ports or a power input.

FIG. 2 depicts an example of a system 200 for powering a state-variable load using one or two ports or a power input. In an alternative embodiment, the system 200 could include three or more ports, but two are depicted in the example of FIG. 2 only for the sake of illustrative simplicity. The system 200 includes ports 202-1 and 202-1 (referred to collectively as ports 202), PD circuits 204-1 to 204-4 (referred to collectively as PD circuits 204), DC-DC converters 206-1 and 206-2 (referred to collectively as DC-DC converters 206), PG signal paths 208, a power sum circuit 210, and a digital logic block (DLB) 212. These components are similar to the components described with reference to FIG. 1. In addition, the system 200 includes a power input 222, a DC-DC converter 224, an OR-ing module 226, and a power distribution network 228.

In an illustrative embodiment, the port 202-1 may be referred to as a primary port and the port 202-2 may be referred to as an auxiliary port. In a PoE implementation, only the primary port need be PoE-compliant. For example, the port 202-1 could include data and power inputs, while the port 202-2 includes only data (i.e., no power) inputs. Thus, for illustrative purposes, port 202-1 may have "more functionality" than port 202-2. Each of the ports is coupled to, in the example of FIG. 2, two PD circuits. A port may be referred to as receiving "high power" if it is currently providing power to both PD circuits to which the port is coupled. A port may be referred to as receiving "low power" if it is currently providing power to one of the two PD circuits to which the port is coupled.

In an illustrative embodiment, the PD circuits 204-1 and 204-2 may be referred to as primary PD circuits, and the PD circuits 204-3 and 204-4 may be referred to as auxiliary PD circuits. The functionality of the primary/auxiliary scheme is described later with reference to FIG. 5. However, it is worth noting that if power is provided on PD circuit 204-1 (primary) or PD circuit 204-4 (auxiliary), then that power is provided on DC-DC converter 206-1, which is coupled thereto. Similarly, if power is provided on PD circuit 204-2 (primary) or PD circuit 204-3 (auxiliary), then the power is provided on DC-DC converter 206-2.

In the example of FIG. 2, the power from two PD circuits is provided to the DC-DC converter without summing. Thus, if the primary and auxiliary PD circuits both provide power, the power is redundant, as is typical for a primary/auxiliary power scheme. The PD circuits 206 are both coupled to the power sum circuit 210, which sums the power provided from the PD circuits 206. Thus, the power sum circuit 210 can output power that is greater than that received on a single PD circuit (or on a single port).

Referring back to the PD circuits 204, each of the PD circuits 204 has a power good (PG) signal that is sent to the DLB 212. For illustrative purposes, the PG signal is assumed to be on (or "true") when power is provided on the respective PD circuit. If no or insufficient power is provided on the respective PD circuit, the PG signal is assumed to be off (or "false"). Using the PG signals from each of the PD circuits 204, the DLB 212 can implement a power-state-sensitive scheme for providing power to a load, such as the load 214.

In the example of FIG. 2, the load 214 includes one or more power state variable loads 216-1 to 216-N (referred to collectively as power state variable loads 216) and a default load 218. It should be noted that, since the load 214 includes one or more power state variable loads 216, the load 214 itself could be referred to as a "power state variable load", though such a description is avoided with reference to FIG. 2 so as to avoid confusing the load 214 with the power state variable loads 216.

In an illustrative embodiment, the default load 218 may be powered in a low power state—which may or may not be the default power state—and the power state variable loads 216 may be powered in a high power state. It may be noted that if there is only a low power state and a high power state, the power state variable loads 216 may consist of a single power state variable load. Alternatively, if there are multiple power states due to weighted power values due to, for example, variable power provided on various PD circuits, or due to using N PD circuits (see, e.g., FIG. 1) that can be summed in various ways, or for other reasons, there may be an arbitrarily large number of power states that correspond to powering a corresponding number of power state variable loads 216.

In an illustrative embodiment, the DLB 212 controls power to the power state variable loads 216. This may be implemented, at least conceptually, as a plurality of switches (not shown) coupled to each of the power state variable loads 216. As used in this case, a switch is any device that can be controlled to open or close such that power is provided (or not) to a load. A switch is presumably not necessary for the default load 218, though the circuit could conceivably be implemented without a default load.

Power could be provided directly from the power sum circuit 210 to the power distribution network 228. However, for illustrative purposes, FIG. 2 includes an alternative optional possibility. Specifically, power may be provided on the power input 222 and to the DC-DC converter 224. The DC-DC converter 224 includes a PG signal that is coupled to the DLB 212. In a specific implementation, the power provided on the power input 222 is sufficient to power all of the power state variable loads 216. This could be the equivalent of, for example, a device that has ports 202 that may or may not provide relatively small amounts of power and a power input 222 for receiving from the grid as much power as the device needs for full-power operation. In this specific implementation, the PG signal from the DC-DC converter 224 could trigger a response from the DLB 212 to close the switches to all of the power state variable loads 216 (allowing them to receive power from the power distribution network 228).

In the example of FIG. 2, the OR-ing circuitry 226 receives as input power from the power sum circuit 210 and the DC-DC converter 224. The specific implementation of the OR-ing circuitry is not critical, though it may be desirable for the OR-ing circuitry 226 to allow the greater power through (the greater power, in a specific implementation, coming from the DC-DC converter 224). This can be accomplished using known or convenient techniques.

In the example of FIG. 2, the power distribution network 228 provides power from either one or both of the ports 202 or the power input 222. The power distribution network 228 may be any known or convenient device, including but not limited to power plane, bus traces, bus bars, heavy gauge wiring, etc. While the power distribution network 228 is depicted as providing power to the load 214, it may be noted that the power distribution network 228 could be designed to provide power to some or all of the various components of the system 200. In such a case, the initial power phase could be considered a "default power condition" for a default load that includes the default load 218 and other components (couplings not shown). A decisioned phase should be any of the other loads being turned on (additional loads could be brought on one at a time or all at once, depending upon the embodiment and/or implementation).

Advantageously, the optional power input 222 allows the system 200 to be "plugged in" to a power outlet when one is available. Also, the system 200 can continue to operate at either full or partial functionality if there is a power failure affecting the power outlet. As was described with reference to system 100 (FIG. 1), when no power outlet is available, power provided on the ports 202 can be used to power the power state-variable load.

Figure 3:
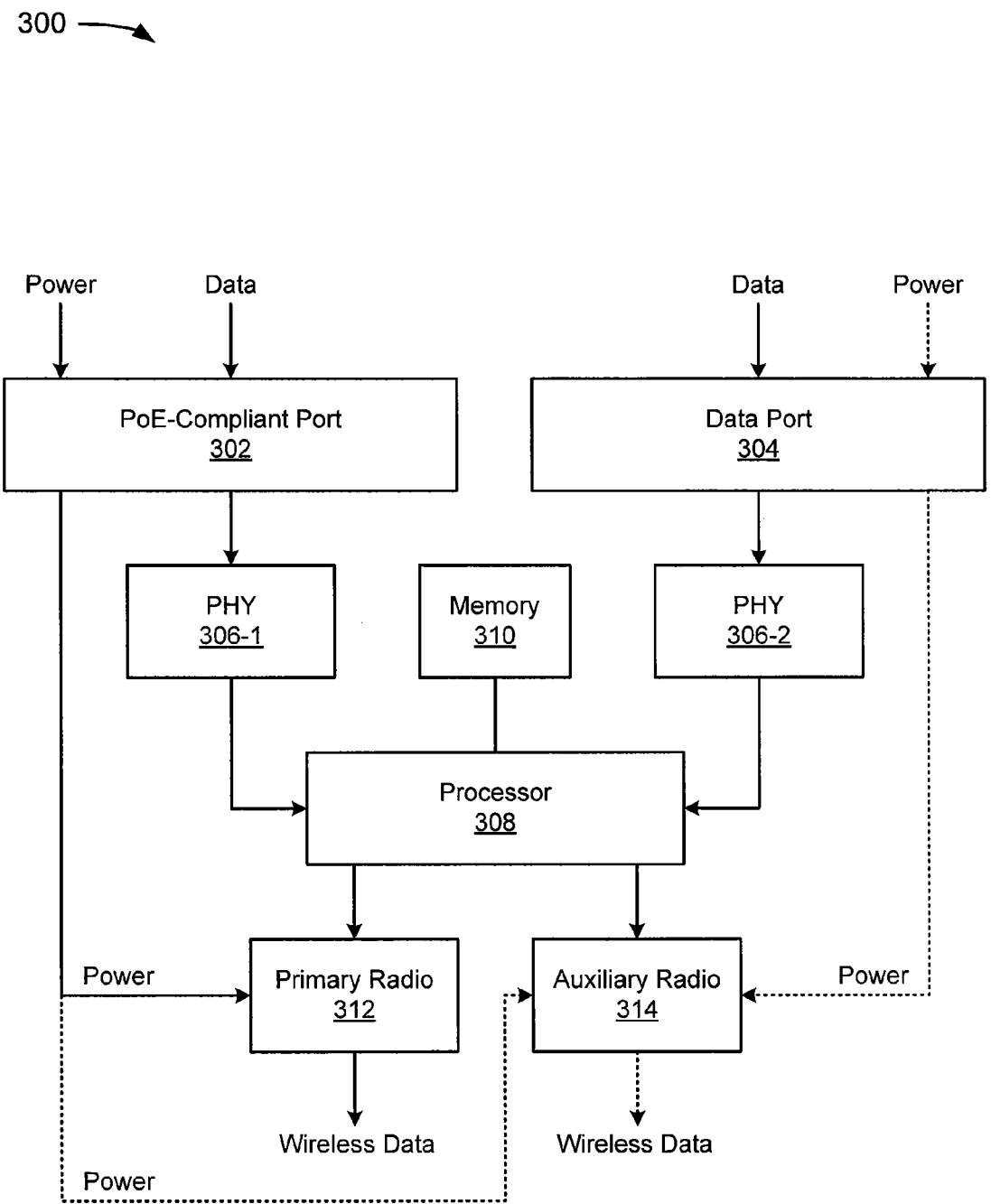
FIG. 3 depicts an example of a system for powering primary and secondary radios through one or two PoE-compliant ports.

FIG. 3 depicts an example of a system 300 for receiving data through one or two PoE-compliant ports. In the example of FIG. 3, the system 300 is specifically directed, by way of example but not limitation, to a wireless (radio) system. While the system 200 was used to illustrate how power is provided to the load, the system 300 is intended to illustrate how data passes through the system. The system 300 includes a PoE-compliant port 302, a data port 304, two PHY layers 306-1 and 306-2 (referred to collectively as PHY layers 306), a processor 308, memory 310, a primary radio 312, and an auxiliary radio 314.

In the example of FIG. 3, the PoE-compliant port 302 is a coupled to an Ethernet network via, for example, one or more coax cables, CAT3 cables, CAT5 cables, CAT 5e cables, CAT6 cables, or any other applicable known or convenient means for connecting to an Ethernet network. The PoE-compliant port 302 may be an RJ45 port, but this is not critical. In general, the PoE-compliant port may be any known or convenient interface that is capable of receiving data and power from the Ethernet network. For illustrative purposes, the PoE-compliant port 302 is depicted as receiving data and power. The power from the PoE-compliant port 302 is depicted as being coupled to the primary radio 312. However, in operation, the power could be coupled to a PD circuit (see, e.g., FIG. 1 or 2), and distributed to various components including, for example, the auxiliary radio 314.

It should be noted that the term "RJ45" is not used consistently in the telecommunications industry. For the purposes of this application, the term is intended to include any "eight positions, eight conductors" (8P8C) connectors. Although it is not required that the RJ45 have a particular number of pins, a typical implementation would include eight pins, which can be divided into a first pairs set of four pins and a second pairs set of four pins. The first pairs set (in a typical implementation) includes pins 1, 2, 3, and 6. The second pairs set (in the typical implementation) includes pins 4, 5, 7, and 8.

In the example of FIG. 3, the data port 304 is coupled to a network through which data is received. The data port 304 may or may not be PoE-compliant. For example, the data port 304 could include an RJ45 port that is PoE-compliant, or an RJ11 port that is not. The choice is implementation-specific. The data port 304 may or may not be coupled to an Ethernet network, though in a specific implementation, the data port 304 is coupled to the same network as the PoE-compliant port 302 (i.e., an Ethernet network). For illustrative purposes, the data port 304 is depicted as receiving data. Since the data port 304 may or may not receive power, power input is depicted with a dashed line, which is intended to mean that the power input is optional.

In the example of FIG. 3, the ports 302, 304 are respectively coupled to the PHY layers 306. The PHY layers 306, in an illustrative embodiment, may include one or more PD circuits that are 802.3af-compliant. Data provided at the ports 302, 304 passes through the PHY layers 306 to the processor 308. The processor 308 will typically, though not necessarily, include software components in the memory 310. Thus, implemented procedures may be referred to as "embodied in a computer-readable medium."

The processor 308 provides data from the PHY layers 306 to the primary radio 312. If sufficient power is provided by the PoE-compliant port 302 (or from the data port 304), the processor 308 also provides power to the auxiliary radio 314. In this way, power may be provided to the primary radio 312 in a low power PoE mode; and to both the primary radio 312 and the auxiliary radio 314 in a high power PoE mode. More generally, a system may provide power to a first circuit (e.g., the primary radio 312) and to a second circuit (e.g., the auxiliary radio 314) if sufficient power is available.

Wireless data output by the primary radio 312 may include data received on the PoE-compliant port 302 or data received on the data port 304, or a combination thereof. Similarly, wireless data output by the auxiliary radio 314 may include data received on the PoE-compliant port 302 or data received on the data port 304, or a combination thereof.

A wireless domain may include, by way of example but not limitation, a Trapeze Networks, Inc. MOBILITY DOMAIN™ wireless domain. The wireless domain may include a wireless switch and one or more access points (APs). The wireless switch may include, by way of example but not limitation, a Trapeze Networks, Inc. MOBILITY EXCHANGE™ (or MX®) switch. However, any applicable known or convenient switch that is capable of coupling APs of a wireless network together could be used. The APs may include, by way of example but not limitation, Trapeze Networks, Inc. MOBILITY POINT™ (or MP®) APs. However, any applicable known or convenient AP that is capable of coupling a wireless device (or station) to the switch could be used. It may be noted that a station could include an AP.

It should be noted that not all technologies include the term AP in the literature. For example, SGSN technology does not refer to an access point as an "AP." However, all wireless access technologies require something comparable (i.e., a node at which wireless communications are received and/or transmitted). For example, an independent basic service set (BSS) includes stations that access the service area by directly communicating with one another; thus, the access nodes are the stations themselves. Accordingly, AP is considered to be generally applicable to any technology, regardless of actual verbiage used to describe a BSS with equivalent functionality.

Referring once again to FIG. 3, an AP may include the system 300. When sufficient power is provided on the PoE-compliant port 302 (and/or optionally on the data port 304), the AP can operate the primary radio 312 and the auxiliary radio 314 simultaneously, thereby (presumably) improving performance. Advantageously, the AP can be installed without knowledge of whether a low power wireless standard (e.g., 802.11a/b/g) or a high power wireless standard (e.g., 802.11n) will be used by the AP because the system 300 is power aware.

Figure 4:
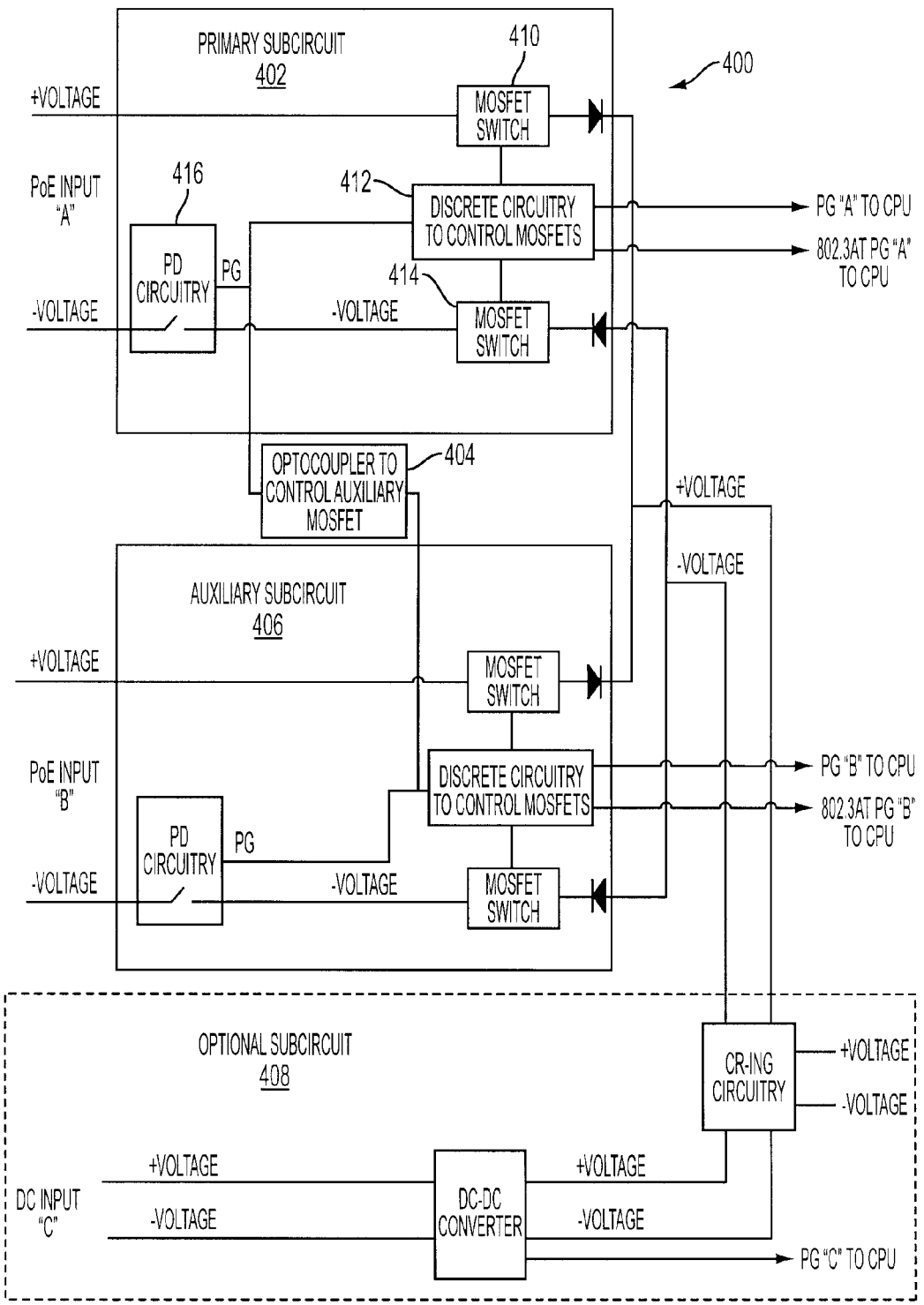
FIG. 4 depicts an example of a system having a primary/auxiliary function, and optional DC input circuitry.

FIG. 4 depicts an example of a system 400 having a primary/auxiliary function, and optional DC input circuitry. The system 400 includes a primary subcircuit 402, an optocoupler 404, an auxiliary subcircuit 406, and an optional subcircuit 408. It should be noted that the outputs of the circuits are depicted as going "to CPU", which is simply a shorthand for to a decision-making module. With reference by way of example to FIG. 2, the outputs would be depicted as to digital logic block 212. It should further be noted that the 802.3 at output is a specific technology, though the system depicted in FIG. 4 may be applicable to other technologies as well.

Within the primary subcircuit 402, a MOSFET switch 410 is coupled between a +voltage source and sink. The MOSFET switch 410 is controlled by discrete circuitry to control MOSFETs 412. If the switch 410 is closed, the circuit is closed at that point, while if the switch 410 is open, the circuit is open. The discrete circuitry to control MOSFETs 412 controls a switch 414 coupled between a −voltage source and sink in a similar manner. In addition, PD circuitry 416 is coupled between the −voltage source and sink, and is capable of closing the circuit at that point or opening the circuit. When voltage can pass through the PD circuitry 416, the switch is closed, and the PG signal communicates this data to the discrete circuitry to control MOSFETs 412. Presumably, the MOSFET switch 414 would be closed when −voltage is available as determined by the PD circuitry, and the MOSFET switch 410 would be closed when +voltage is available. In this way, power can be provided continuously from the PoE input "A".

The optocoupler 404 and a discrete circuitry to control MOSFETs in the auxiliary subcircuit 406 control MOSFET switches in the auxiliary subcircuit 406, which also has a PG input to the discrete circuitry. Other than the optocoupler 404 input to the auxiliary subcircuit 406, the auxiliary subcircuit 406 may be quite similar to the primary subcircuit 402. Thus, power can be provided continuously from the PoE input "B", unless the optocoupler 404 controls the auxiliary MOSFETs to do otherwise.

The optional subcircuit 408 includes a DC-DC converter that receives power from a DC Input "C". The DC-DC converter is coupled to OR-ing circuitry. The OR-ing circuitry is also coupled to the outputs of the primary subcircuit 402 and the auxiliary subcircuit 406. The output of the OR-ing circuitry is either the power from the DC Input "C" or one of the PoE inputs "A" or "B" (or their sum).

In addition to power output, the subcircuits have PG outputs. For example, the primary subcircuit 402 has a PG "A" to CPU output and an 802.3 at PG "A" to CPU output; the auxiliary subcircuit 406 has a PG "B" to CPU output and an 802.3 at PG "B" to CPU output; the optional subcircuit 408 has a PG "C" to CPU output. The PG "A" to CPU output, PG "B" to CPU output, and PG "C" to CPU output are pretty straight-forward: if power is received on PoE input "A", then the PG "A" to CPU output is true, if power is received on PoE input "B", then the PG "B" to CPU output is true, and if power is received on DC input "C", then the PG "C" to CPU output is true. However, the 802.3 at PG "A" to CPU output indicates that the power is higher than for a standard PoE (e.g., 802.3af). This increased power may be from receiving a higher power signal or from receiving multiple lower power signals, as is described later with reference to FIG. 5.

Figure 5:
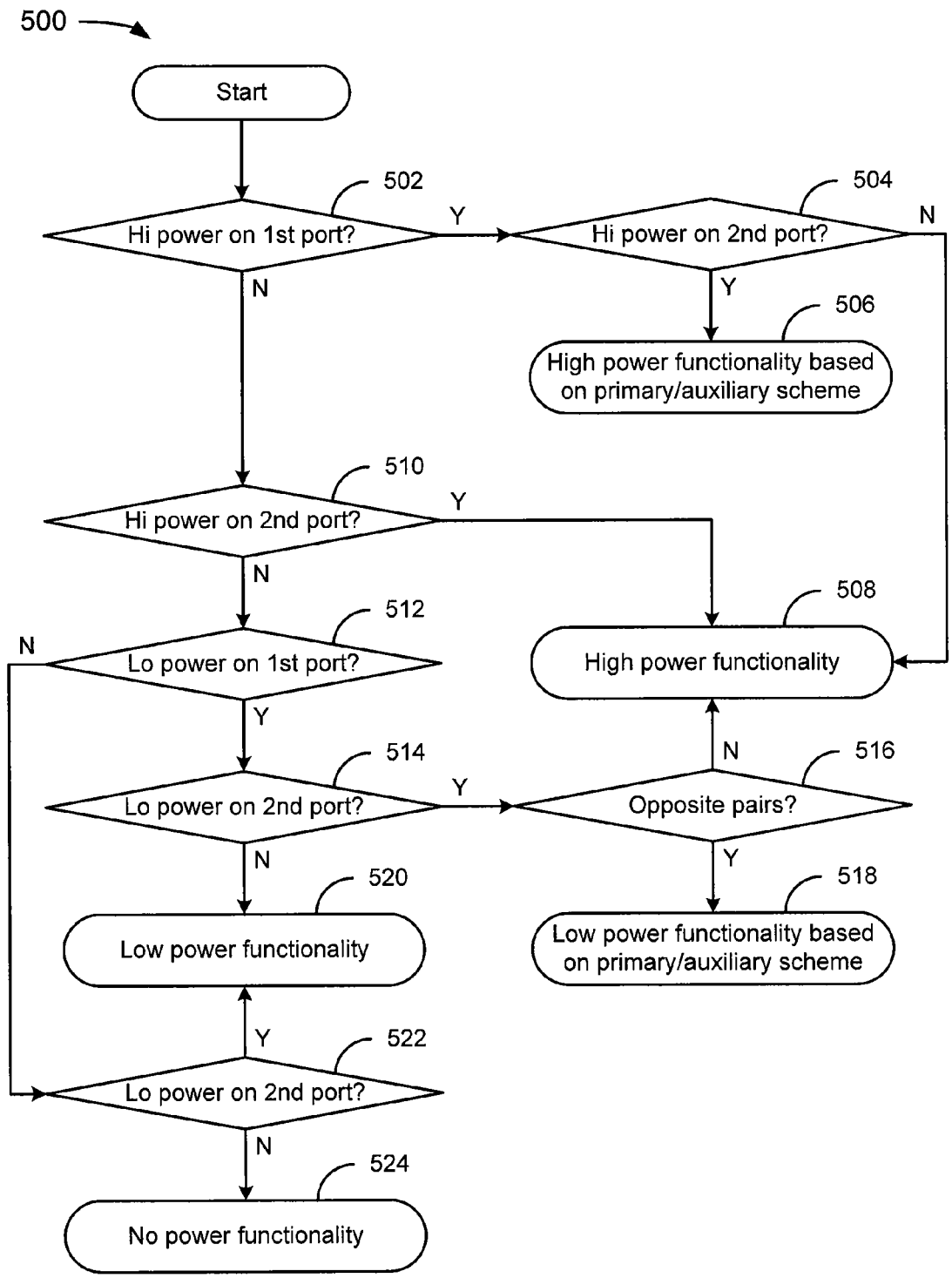
FIG. 5 depicts a flowchart of an example of a method for providing power to a power state-variable load.

FIG. 5 depicts a flowchart 500 of an example of a method for providing power to a power state-variable load. This method and other methods are depicted as serially arranged modules. However, modules of the methods may be reordered, or arranged for parallel execution as appropriate.

In the example of FIG. 5, the flowchart 500 starts at decision point 502 where it is determined whether high power is provided on a first port. The port may be, by way of example but not limitation, a PoE-compliant port. In this example, it is assumed that there are at two ports coupled to a power sum circuit, but additional ports could be used to provide further redundancy or even higher power sums. Also, in this example it is assumed that there are three power levels: high, low, and none, but additional power levels could be used to provide further sensitivity to the available power. Moreover, the power output of the system assumes three power levels: high, low, and none, but additional power levels could be enabled and the number of available power levels to be output may be different from the number of power levels received on the ports. For example, three ports may be provided with low power. When one port provides low power, the output of the system is low power; when two ports provide low power, the output of the system is medium power; when three ports provide low power, the output of the system is high power.

In the example of FIG. 5, if it is determined that high power is provided on the first port (502-Y), then the flowchart 500 continues to decision point 504 where it is determined whether high power is provided on the second port. If it is determined that high power is provided on the second port (504-Y) as well as the first port, then the system provides high power functionality based on a primary/auxiliary scheme (506) and the flowchart 500 effectively terminates. If, on the other hand, it is determined that high power is not provided on the second port (504-N), then the system provides high power functionality (508) though power received on the first port.

In the example of FIG. 5, if it is determined that high power is not provided on the first port (502-N), then the flowchart 500 continues to decision point 510 where it is determined whether high power is provided on the second port. If it is determined that high power is provided on the second port (510-Y), then the system provides high power functionality (508). If, on the other hand, it is determined that high power is not provided on the second port (510-N), then the flowchart 500 continues to decision point 512 where it is determined whether low power is provided on the first port. It may be noted that if the flowchart 500 has progressed to decision point 512, then high power is provided on neither the first port nor the second port.

In the example of FIG. 5, if it is determined that low power is provided on the first port (512-Y), then the flowchart 500 continues to decision point 514 where it is determined whether low power is provided on the second port. If it is determined that power is provided on the second port (514-Y) as well as the first port, then the flowchart 500 continues to decision point 516 where it is determined whether power is provided on opposite pairs. If it is determined that power is provided on opposite pairs (516-Y) of the first port and the second port, then the system provides low power functionality based on primary/auxiliary scheme (518) and the flowchart 500 effectively ends. If, on the other hand, it is determined that power is not provided on opposite pairs (516-N) of the first port and the second port, then the system provides high power functionality (508) and the flowchart 500 effectively ends. If it is determined that no power is provided on the second port (514-N), then the system provides low power functionality (520) and the flowchart 500 effectively ends.

Returning once again to decision point 512, if it is determined that low power is not provided on the first port (512-N), then the flowchart 500 continues to decision point 522 where it is determined whether low power is provided on the second port. Since it is assumed that provided power is either high, low, or none, at decision point 522 of the example of FIG. 5, no power is being provided on the first port. If it is determined that low power is provided on the second port (522-Y), then the system simply provides low power functionality (520) and the flowchart 500 effectively ends. If, on the other hand, it is determined that low power is not provided on the second port (522-N), then the system provides no power functionality (524) and the flowchart 500 effectively ends. In some implementations, no power functionality (524) may mean more than simply the circuit providing no power to the load. For example, a no power functionality (524) could include rerouting from another (e.g., battery) source and/or rerouting signals (e.g., data and/or power) through a third port. It may be the case that no power functionality (524) never occurs, since the flowchart 500 inherently assumes that some power is received (or else nothing would happen).

It should be noted that, in an illustrative embodiment, if the power levels provided on the ports were to change, the flowchart 500 would "restart" automatically, and the system functionality would adjust as appropriate. This may simply be the result of applying power to a suitably configured circuit, thereby activating the circuit.

As used herein, a wireless network refers to any type of wireless network, including but not limited to a structured network or an ad hoc network. Data on a wireless network is often encrypted. However, data may also be sent in the clear, if desired. With encrypted data, a rogue device will have a difficult time learning any information (such as passwords, etc.) from clients before countermeasures are taken to deal with the rogue. The rogue may be able to confuse the client, and perhaps obtain some encrypted data, but the risk is minimal (even less than for some wired networks).

As used herein, access point (AP) refers to receiving points for any known or convenient wireless access technology. Specifically, the term AP is not intended to be limited to 802.11 APs.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and techniques described herein also relate to apparatus for performing the algorithms and techniques. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A system comprising:
    a first port having a plurality of pins divisible into a first pairs set and a second pairs set;
    a first powered device (PD) circuit, coupled to the first pairs set, having a first power output;
    a second PD circuit, coupled to the second pairs set, having a second power output;
    a first direct current to direct current (DC-DC) converter coupled to the first power output;
    a second DC-DC converter coupled to the second power output;
    a power sum circuit coupled to the first DC-DC converter and the second DC-DC converter wherein, in operation, the power received on the first pairs set is added to the power received on the second pairs set and output by the power sum circuit.

2. The system of claim 1, wherein the first port is an RJ45 port.

3. The system of claim 1, wherein the plurality of pins includes 8 pins, the first pairs set includes 4 pins, and the second pairs set includes 4 pins.

4. The system of claim 3, wherein the first pairs set includes pins 1, 2, 3, and 6.

5. The system of claim 3, wherein the second pairs set includes pins 4, 5, 7, and 8.

6. The system of claim 1, wherein the first PD circuit is 802.3af-compliant.

7. The system of claim 1, wherein the first PD circuit includes a PD chip.

8. The system of claim 1, further comprising a first circuit and a second circuit, wherein:
    the output of the power sum circuit powers the first circuit;
    the output of the power sum circuit powers the second circuit if power from the second DC-DC converter is greater than approximately zero.

9. The system of claim 1, further comprising a first radio and a second radio, wherein:
    the output of the power sum circuit powers the first radio in a low-power power over Ethernet (PoE) mode;
    the output of the power sum circuit powers the first radio and the second radio in a high-power PoE mode.

10. The system of claim 1, further comprising:
    a second port having a plurality of pins divisible into a third pairs set and a fourth pairs set;
    a third powered device (PD) circuit, coupled to the third pairs set, having a third power output;
    a fourth PD circuit, coupled to the fourth pairs set, having a fourth power output;
    wherein the first DC-DC converter is coupled to the third power output;
    wherein the second DC-DC converter is coupled to the fourth power output.

11. The system of claim 10 further comprising a first radio and a second radio, wherein the power sum circuit receives power on the first pairs set and the third pairs set, and the power sum circuit powers the first radio and the second radio in a high-power PoE mode.

12. The system of claim 1, further comprising:
    a port for receiving power from a power source;
    a third DC-DC converter coupling the power from the power source to the power sum circuit.

13. A method comprising:
    providing high power functionality based on a primary/auxiliary scheme if high power is received on a first port and a second port;
    providing high power functionality if high power is received on the first port exclusive-or (xor) the second port;
    providing high power functionality if low power is received on a first pairs pin set of the first port and on a third pairs pin set of the second port;
    providing high power functionality if low power is received on a second pairs pin set of the first port and on a fourth pairs pin set of the second port.

14. The method of claim 13, further comprising:
providing low power functionality based on a primary/auxiliary scheme if low power is received on the first pairs pin set of the first port and on the fourth pairs pin set of the second port;
providing low power functionality based on a primary/auxiliary scheme if low power is received on the second pairs pin set of the first port and on the third pairs pin set of the second port.

15. The method of claim 13, further comprising providing low power functionality if low power is received on the first port xor the second port.

16. The method of claim 13, further comprising providing high power functionality if power is provided on a dedicated power input.

17. A system comprising:
a means for providing 802.11n functionality based on a primary/auxiliary scheme if 802.3at-level power is received on a first port and a second port;
a means for providing 802.11n functionality if 802.3at-level power is received on the first port exclusive-or (xor) the second port;
a means for providing 802.11n functionality if 802.3af-level power is received on a first pairs pin set of the first port and on a third pairs pin set of the second port;
a means for providing 802.11n functionality if 802.3af-level power is received on a second pairs pin set of the first port and on a fourth pairs pin set of the second port.

18. The system of claim 17, further comprising:
a means for providing 802.11a/b/g functionality based on a primary/auxiliary scheme if 802.3af-level power is received on the first pairs pin set of the first port and on the fourth pairs pin set of the second port;
a means for providing 802.11a/b/g functionality based on a primary/auxiliary scheme if 802.3af-level power is received on the second pairs pin set of the first port and on the third pairs pin set of the second port.

19. The system of claim 17, further comprising providing 802.11a/b/g functionality if 802.3af-level power is received on the first port or the second port.

20. The system of claim 17, further comprising providing 802.11n power functionality if power is provided on a dedicated power input.

* * * * *